United States Patent [19]
Lee

[11] Patent Number: 6,031,311
[45] Date of Patent: Feb. 29, 2000

[54] BRUSHLESS DC MOTOR CAPABLE OF PREVENTING LEAKAGE OF MAGNETIC FLUX

[75] Inventor: Sang Cheol Lee, Suwon, Rep. of Korea

[73] Assignee: Samsung Electronics Co., Ltd., Suwon, Rep. of Korea

[21] Appl. No.: 09/188,151

[22] Filed: Nov. 10, 1998

[30] Foreign Application Priority Data

Nov. 13, 1997 [KR] Rep. of Korea .................. 97-59892

[51] Int. Cl.[7] .................................................. H02K 21/12
[52] U.S. Cl. ......................... 310/156; 310/152; 310/192; 310/216; 310/163
[58] Field of Search ................................ 310/156, 179, 310/192, 216, 180, 162, 163, 152

[56] References Cited

U.S. PATENT DOCUMENTS 4,403,161  9/1983  Miyashita et al. ...................... 310/156
4,476,408  10/1984  Honsinger ............................... 310/156
5,684,352  11/1997  Mita et al. .............................. 310/156

*Primary Examiner*—Nestor Ramirez
*Assistant Examiner*—Guillermo Perez
*Attorney, Agent, or Firm*—Burns, Doane, Swecker & Mathis, L.L.P.

[57] ABSTRACT

A brushless DC motor has a stator and a rotor. The stator has a stator core and excitation coils wound around the stator core. The rotor has a rotor core disposed at the inner space of the stator, and many permanent magnets inserted into the rotor core. The permanent magnets are symmetrically tilted with respect to a radial direction of the rotor core. The rotor core is formed with slots for cutting off a magnetic field between the permanent magnets adjacent to each other. The slots are parallel with an axis of the rotor core. The slots are formed between ends of the permanent magnets adjacent to each other at an outer part of the rotor core. The vortex of magnetic flux between the permanent magnets is prevented by the slots.

3 Claims, 2 Drawing Sheets

BRUSHLESS DC MOTOR CAPABLE OF PREVENTING LEAKAGE OF MAGNETIC FLUX

BACKGROUND OF THE INVENTION

1. Field of the Invention

The present invention relates to a brushless DC motor, and more particularly, to a brushless DC motor capable of enhancing the efficiency thereof by preventing leakage of magnetic flux caused by a vortex of magnetic flux generated between the permanent magnets adjacent to each other.

2. Prior Art

A brushless DC motor has a stator having excitation coils, and a rotor having permanent magnets. Torque is generated by the cooperation of the magnetic force generated at the stator by the excitation coils and the magnetic force of the permanent magnets, and the rotor is rotated by the torque.

The permanent magnets in the rotor are assembled with the rotor core in a variety of manners. FIG. 3 shows an example of the stator and the rotor used in a conventional brushless DC motor.

The stator 30 is comprised of a hollow stator core 10 having a plurality of protrusions 11 protruding inward, and excitation coils 12 wound around the protrusions 11 of the stator core 10. The rotor 20 is disposed at the inner space of the stator 30, and is comprised of a cylindrical rotor core 1 and a plurality of permanent magnets 2 inserted therein. The permanent magnets 2 are disposed along the circumferential direction of the rotor core 1 by an equal angular distance with equal angle and equal distance. The adjacent permanent magnets 2 are disposed so that the respective poles N and S thereof face to each other.

When the excitation coils 12 of the stator 30 are supplied with current, a magnetic field is generated on the protrusion part 11 of the stator core 10 by the excitation coils 12. Such a magnetic field forms a rotary magnetic field 21 together with a magnetic field of the permanent magnets 2 in the rotor 20. The rotary magnetic field 21 forms a path circulating from the pole N of one permanent magnet 2 to the pole S of another permanent magnet 2, via the protrusion 11 excited to the pole S, the inner side of the stator core 10, and the protrusion 11 excited to the pole N, successively. The torque for rotating the rotor 20 is generated by the rotary magnetic field 21.

However, since the pole of one permanent magnet 2 in the inside of the rotator core 1 is different from that of another adjacent permanent magnet 2, the magnetic flux generated between the adjacent pars of the respective permanent magnets 2 is not included in the rotary magnetic field 21, but forms a vortex 25 of the magnetic flux flowing directly toward an adjacent permanent magnet 2. Such a vortex 25 of the magnetic flux comes a leakage of the magnetic flux because it is not included in the rotary magnetic field 21 contributing to the generation of torque of the rotor 20, which may cause lowering of the efficiency of the motor.

SUMMARY OF THE INVENTION

The present invention has been proposed to overcome the above-described problems in the prior art, and accordingly it is the object of the present invention to provide a brushless DC motor capable of enhancing the efficiency thereof by cutting off the vortex of the magnetic flux generated between the permanent magnets adjacent to each other and inducing such a magnetic flux into the rotary magnetic field.

To achieve the above object, the present invention provides a brushless DC motor comprising: a stator having excitation coils; and a rotor having a rotor core disposed at an inner space of the stator, and a plurality of permanent magnets inserted into the rotor core. The rotor core is formed with slots for cutting off a magnetic field between the permanent magnets adjacent to each other. The slots are parallel with an axis of the rotor core.

The permanent magnets are symmetrically tilted with respect to a radial direction of the rotor core. The slots are formed between respective ends of the permanent magnets adjacent to each other at an outer part of the rotor core.

Preferably, each of the permanent magnets has a bent part formed at an outer end thereof, which is bent so as to be parallel with an adjacent permanent magnet. The leakage of magnetic flux is more reduced by the bent part.

Furthermore, each of the permanent magnets is formed with a notch at a bent position thereof. The notch is parallel with the axis. The magnetic flux generated at the bent position is induced toward the inner area of the rotor core by the air in the space formed by the notch. Thus, the vortex of magnetic field is prevented more effectively, and the efficiency of motor is more increased.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Figure 3:
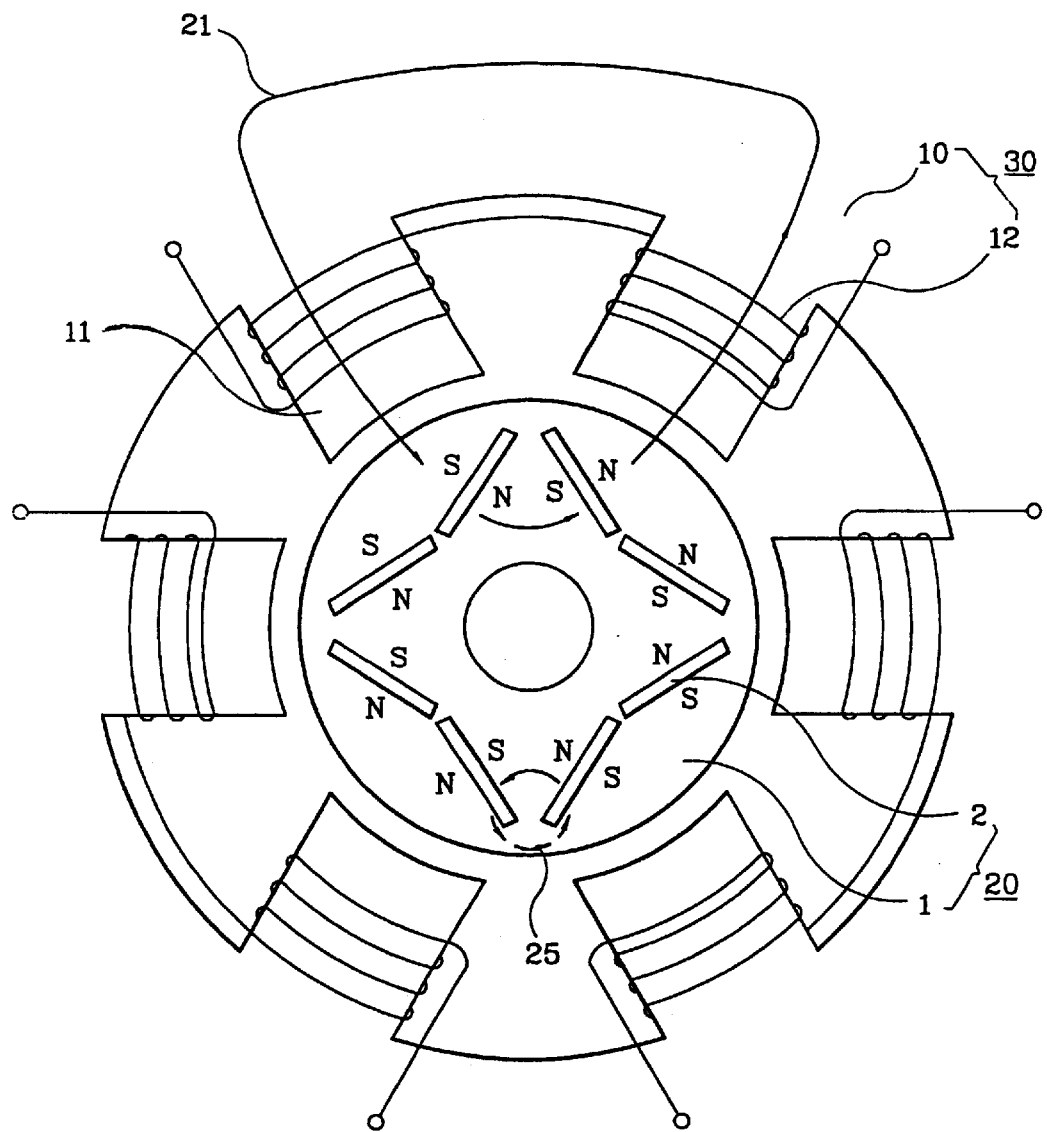
FIG. 3 is a sectional view of a conventional brushless DC motor.

Hereinafter, the present invention will be described in detail with reference to the accompanying drawings. Parts identical to those in the conventional brushless DC motor shown in FIG. 3 are referred to with the same reference numerals.

Figure 1:
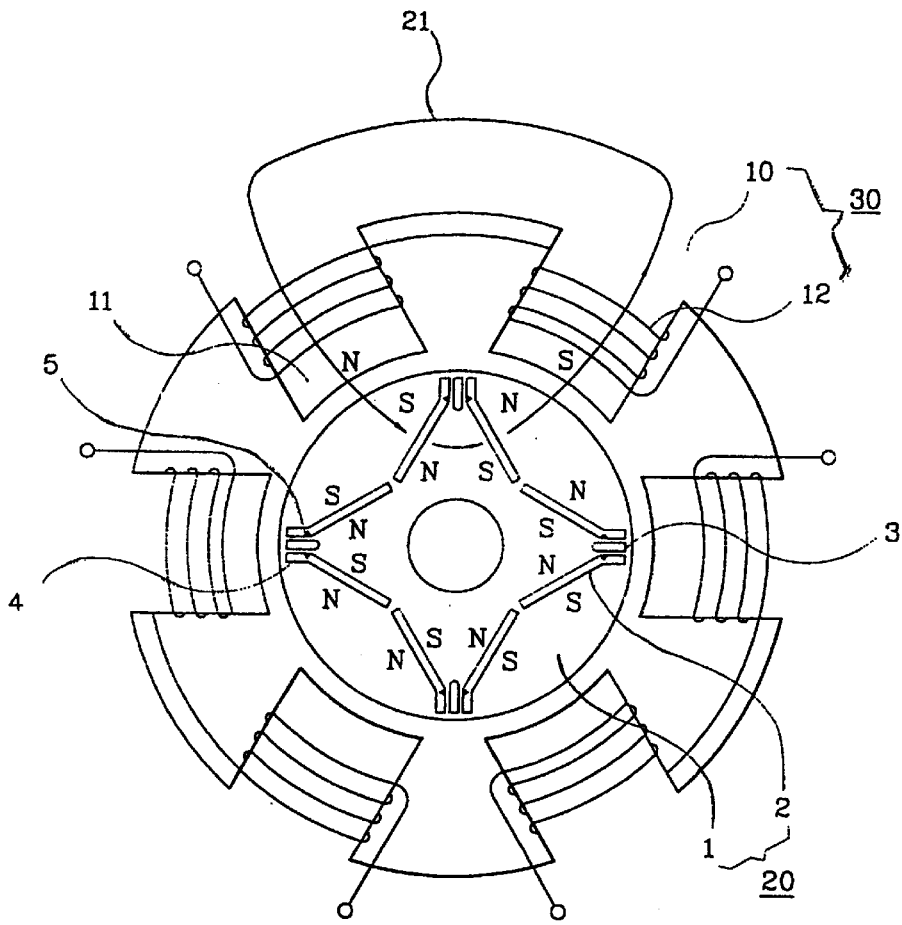
FIG. 1 is a sectional view of a brushless DC motor according to the present invention.
Figure 2:
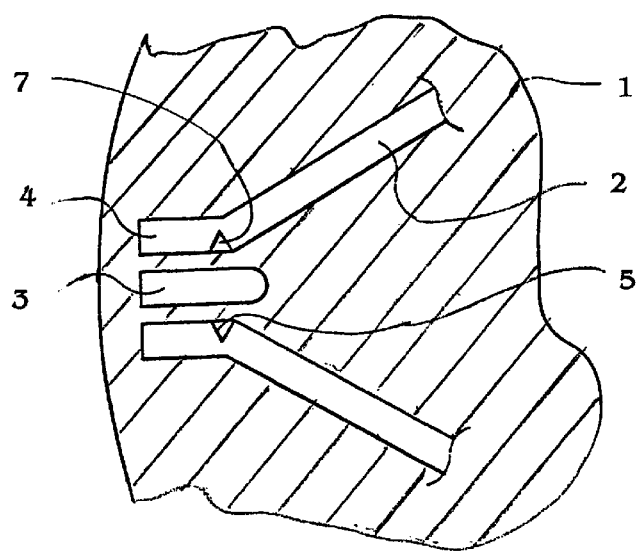
FIG. 2 is a partial enlarged view of FIG. 1.

FIG. 1 is a sectional view of a brushless DC motor according to the present invention, and FIG. 2 is a partial enlarged view of FIG. 1. The brushless DC motor has a stator 30 and a rotor 20.

The stator 30 is comprised of a hollow stator core 10 having a plurality of protrusions 11 protruding inward, and excitation coils 12 wound around the protrusions 11 of the stator core 10.

The rotor 20 is disposed at the inner space of the stator 30, and is comprised of a cylindrical rotor core 1 and a plurality of permanent magnets 2 accommodated therein. The permanent magnets 2 are inserted into the rotor core 1 along the axis thereof.

As shown in FIG. 1, four pairs of permanent magnets 2 are inserted into the rotor core 1. The permanent magnets 2 are symmetrically tilted with respect to a radial direction of the rotor core 1, and are disposed along the circumferential direction of the rotor core 1 by an equal angular distance with each other. Thus, each pair of the permanent magnets 2 are disposed so as to be V-shaped substantially. Further, the permanent magnets 2 adjacent to each other are disposed so that the respective poles N and S thereof are facing to each other.

The rotor core 1 is formed with slots 3 for cutting off a magnetic field between the permanent magnets 2 adjacent to each other. The slots 3 are parallel with an axis of the rotor core 1. The slots 3 are disposed at the outer part of the rotor core 1 between the ends of the respective permanent magnets 2 adjacent to each other.

Furthermore, each of the permanent magnets 2 has a bent part 4 formed at an outer end thereof, which is bent so as to be parallel with an adjacent permanent magnet 2. The bent parts 4 of the respective permanent magnets 2 are facing to each other. A V-shaped notch 5 is formed at the bent position of the bent part 4 along the axis direction of the rotor core 10. As shown in FIG. 2, spaces 7 are formed in the rotor core 1 by the notches 5. The notches formed on adjacent permanent magnets face one another as shown in FIG. 2.

When the excitation coils 12 of the stator 30 are supplied with current, a magnetic field is generated on the protrusion part 11 of the stator core 10 by the excitation coils 12. Such a magnetic field forms a rotary magnetic field 21 together with a magnetic field of the permanent magnet 2 of the rotor 20. The rotary magnetic field 21 forms a path circulating from the pole N of one permanent magnet 2 to the pole S of another permanent magnet 2, via the protrusion 11 excited to the pole S, the inner side of the stator core 10, and the protrusion 11 excited to the pole N, successively. The torque for rotating the rotor 20 is generated by the rotary magnetic field 21.

In such a situation, the magnetic flux generated at the outer end of the permanent magnet 2, i.e., at the bent part 4, is cut off by the slot 3. That is, the rotor core 1 is made of a material having high permeability, but the air barrier in the slot 3 has low permeability, so the magnetic flux generated at the outer end of the permanent magnet 2 is induced toward the inner area of the rotor core 1 having high permeability. Accordingly, the vortex of the magnetic flux is not generated between the permanent magnets 2. The magnetic flux induced to the inner area of the rotor core 1 is included in the rotary magnetic field 21, and it contributes to the generation of torque giving the rotational force to the rotor 20. Accordingly, the leakage of magnetic flux does not occur, and the efficiency of motor is enhanced.

Meanwhile, since the bent parts 4 are formed at the outer ends of the respective permanent magnets 2, the permanent magnets 2 are spaced from each other by a predetermined distance, whereby the leakage of the magnetic flux is more reduced. Furthermore, since the bent parts 4 are facing to each other, the area of the permanent magnets 2, which face the slots 3 directly, is increased. Thus, the vortex of magnetic flux can be cut off by the slots 3 more effectively.

Moreover, the magnetic flux generated at the bent position is induced toward the inner area of the rotor core 1 by the air in the space 7 formed by the notch 5. The induced magnetic flux is included in the rotary magnetic field 21, whereby the vortex of magnetic field is prevented more effectively, and the efficiency of motor is more increased.

As described above, according to the present invention, the vortex of magnetic flux is prevented by the slots 3 formed between the permanent magnets 2, whereby the leakage of magnetic flux does not occur. Thus, the efficiency of motor is increased. Furthermore, the efficiency of motor is more increased by the bent parts 4 and the notches 5.

Although the present invention has been described and illustrated in detail, it is clearly understood that the same is by way of illustration and example only and is not to be taken by way of limitation, wherein the spirit and scope of the present invention is limited only by the terms of the appended claims.

What is claimed is:

1. A brushless DC motor comprising:

a stator having excitation coils; and a rotor having a rotor core disposed at an inner space of said stator, and a plurality of permanent magnets inserted into said rotor core;

said rotor core formed with slots for cutting off a magnetic field between said permanent magnets adjacent to each other, said slots being parallel with an axis thereof;

said permanent magnets being symmetrically tilted with respect to a radial direction of said rotor core, and said slots formed between respective ends of said permanent magnets adjacent to each other at an outer part of said rotor core;

each of said permanent magnets having a bent part formed at an outer end thereof, which is bent so as to be parallel to a bent part of an adjacent permanent magnet;

each of said permanent magnets being formed with a notch at a bent position thereof, said notch being parallel with the axis.

2. The motor according to claim 1 wherein said notches are of V-shaped cross section.

3. The motor according to claim 1 wherein said notches formed on adjacent permanent magnets face one another.

* * * * *